US012758977B2

(12) United States Patent
Wild et al.

(10) Patent No.: US 12,758,977 B2
(45) Date of Patent: Oct. 13, 2026

(54) METHOD FOR CONTROLLING A THERMAL CYCLER, AND THERMAL CYCLER

(71) Applicant: EPPENDORF SE, Hamburg (DE)

(72) Inventors: Michael Wild, Hamburg (DE); Kirsten Schicke, Hamburg (DE)

(73) Assignee: EPPENDORF SE, Hamburg (DE)

(*) Notice: Subject to any disclaimer, the term of this patent is extended or adjusted under 35 U.S.C. 154(b) by 882 days.

(21) Appl. No.: 17/278,007

(22) PCT Filed: Sep. 20, 2019

(86) PCT No.: PCT/EP2019/075286
§ 371 (c)(1),
(2) Date: Mar. 19, 2021

(87) PCT Pub. No.: WO2020/058461
PCT Pub. Date: Mar. 26, 2020

(65) Prior Publication Data

US 2021/0370305 A1 Dec. 2, 2021

(30) Foreign Application Priority Data

Sep. 21, 2018 (EP) .................................... 18195975

(51) Int. Cl.
*B01L 7/00* (2006.01)

(52) U.S. Cl.
CPC ........... *B01L 7/52* (2013.01); *B01L 2200/147* (2013.01); *B01L 2300/024* (2013.01); *B01L 2300/027* (2013.01); *B01L 2300/043* (2013.01)

(58) Field of Classification Search
None
See application file for complete search history.

(56) References Cited

U.S. PATENT DOCUMENTS

| | | | | |
|---|---|---|---|---|
| 5,333,675 A * | 8/1994 | Mullis | C07H 21/00 | 422/116 |
| 5,475,610 A * | 12/1995 | Atwood | B01L 3/50851 | 422/943 |
| 5,576,197 A * | 11/1996 | Arnold | B01L 3/50825 | 435/6.12 |
| 5,656,493 A * | 8/1997 | Mullis | B01J 19/0046 | 236/97 |
| 12,624,386 B2 * | 5/2026 | Trifiro | C12Q 1/6851 | |
| 2002/0072112 A1 * | 6/2002 | Atwood | G05D 23/1917 | 435/303.1 |
| 2004/0122559 A1 * | 6/2004 | Young | G05B 13/021 | 700/269 |

(Continued)

FOREIGN PATENT DOCUMENTS

| | | |
|---|---|---|
| EP | 1275438 A2 | 1/2003 |
| EP | 2097575 A1 | 9/2009 |

(Continued)

*Primary Examiner* — Brian R Gordon
(74) *Attorney, Agent, or Firm* — Todd Lorenz

(57) ABSTRACT

The invention relates to a method for controlling a thermal cycler and a thermal cycler, in which the determination of at least one temperature change rate is carried out by an evaluation program using tempering schedule data and run time data, whereby in particular the tempering behavior of a slower thermal cycler can be simulated on a faster thermal cycler.

7 Claims, 6 Drawing Sheets

(56) References Cited

U.S. PATENT DOCUMENTS

2004/0265892 A1* 12/2004 Wittwer .................... B01L 7/52 435/6.12
2007/0099208 A1* 5/2007 Drmanac ............... C07K 1/047 435/6.12
2008/0003649 A1* 1/2008 Maltezos ............ B01L 3/50851 435/286.1
2008/0057542 A1 3/2008 Roberts et al.
2008/0248534 A1* 10/2008 Lim ....................... G05D 23/32 435/286.1
2008/0274511 A1* 11/2008 Tan ........................... B01L 7/52 435/303.1
2010/0173394 A1* 7/2010 Colston, Jr. ....... B01L 3/502715 422/68.1
2010/0248348 A1* 9/2010 Ohkawa ............... C12Q 1/6851 435/287.2
2012/0015365 A1* 1/2012 Bodin .................. C12Q 1/6876 435/6.12
2013/0132006 A1* 5/2013 Gwynn ................... B01L 3/021 702/55
2013/0143199 A1* 6/2013 Wilson ...................... B01L 3/52 435/3
2013/0344588 A1* 12/2013 Halushka ............. C12Q 1/6804 422/534
2014/0073013 A1* 3/2014 Gorman .................... B01L 7/52 435/91.2
2015/0024474 A1 1/2015 Chiou et al.
2015/0099642 A1* 4/2015 Barany ................ C12Q 1/6806 506/38
2015/0151302 A1* 6/2015 Egan ...................... C12Q 1/686 435/286.1
2016/0256845 A1 9/2016 Lim et al.
2017/0157613 A1* 6/2017 Li ............................. B01L 7/52
2017/0176479 A1* 6/2017 Lüdicke .............. G06F 3/04847
2018/0193831 A1* 7/2018 Hopper .................... F04B 43/00
2019/0376129 A1* 12/2019 Hopper ................ C12Q 1/6851
2020/0086325 A1* 3/2020 Chou ......................... B01L 7/52
2021/0069709 A1* 3/2021 Chou ......................... B01L 7/52
2021/0291190 A1* 9/2021 Newman-Lehman ....................... G16B 25/00
2022/0001387 A1* 1/2022 Figley .................... B01L 7/5255
2023/0193366 A1* 6/2023 Escajeda .............. C12Q 1/6844

FOREIGN PATENT DOCUMENTS

EP 2153901 A1 2/2010
EP 2338599 A1 6/2011
JP H06-233670 A 8/1994
JP 2014-131493 A 7/2014
JP 2014-147296 A 8/2014
JP 2016-144431 A 8/2016

* cited by examiner

METHOD FOR CONTROLLING A THERMAL CYCLER, AND THERMAL CYCLER

The invention relates to a method for the determination of a temperature change rate for controlling a tempering apparatus of a thermal cycler. Furthermore, the invention relates to a thermal cycler with its control being configured for the execution of such a method.

A thermal cycler is a laboratory apparatus capable of adjusting the temperature of at least one laboratory sample in time succession to a predetermined temperature and maintaining it at that temperature level for a predetermined duration. The process sequence of this temperature control is cyclic. This means that a predetermined temperature cycle, i.e. a sequence of at least two temperature steps, typically three temperature steps, is executed repeatedly. This method is usually used for performing a polymerase chain reaction (PCR).

When performing a DNA amplification with PCR, the user has to rely—for optimal results—on the sample being precisely and reproducibly tempered over time according to a user-specified tempering schedule.

Figure 2A:
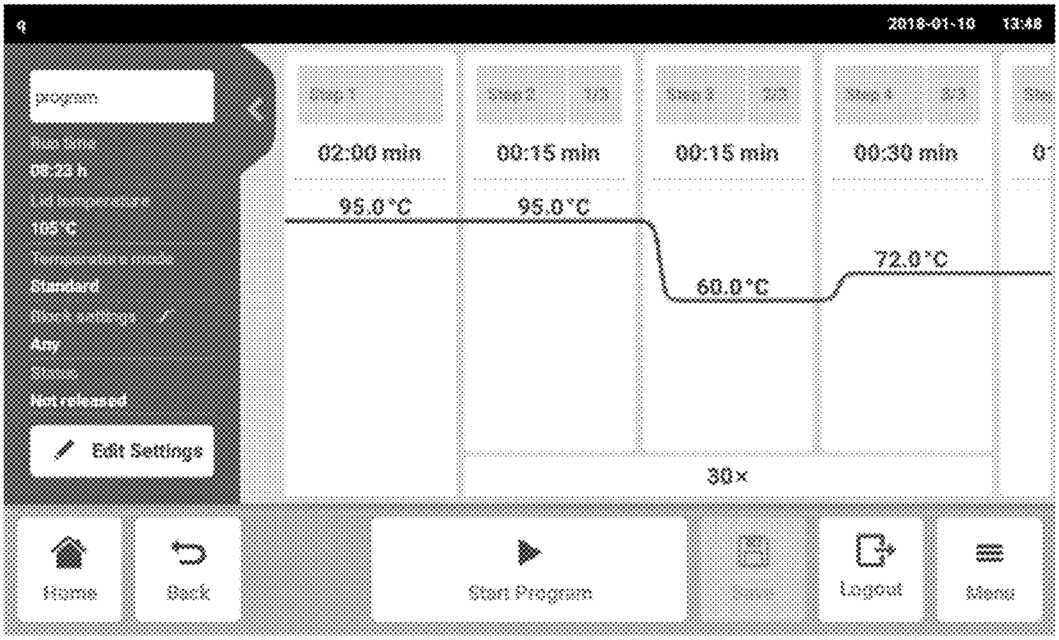

The temperature cycle of a thermal cycler is specified by the user by setting a tempering schedule, usually directly on an operational control device of the apparatus. As an example, such a cycle with adjustment possibility is shown in FIG. 2A with reference to a screen display of an exemplary thermal cycler according to the present invention. This involves the user specifying the height of each temperature step in a cycle and its hold time, as well as the total number of cycles to be completed. The control of thermal cycler ensures that the tempering schedule is implemented as accurately as possible in accordance to these specifications. The control of the apparatus uses certain control parameters that are adapted to the hardware components used in the thermal cycler and that are, for the most part, cannot be exactly determined by the user. In particular, Peltier elements, which are usually used in the tempering devices of the thermal cycler for as tempering elements for tempering the sample block (thermal block), exhibit difference performance values. The result of the tempering is also determined by all hardware—and material parameters of the thermal cycler that have an influence on the heat transfer, i.e. the heat supply and the heat dissipation, from the liquid laboratory samples to the Peltier element.

Figure 2B:
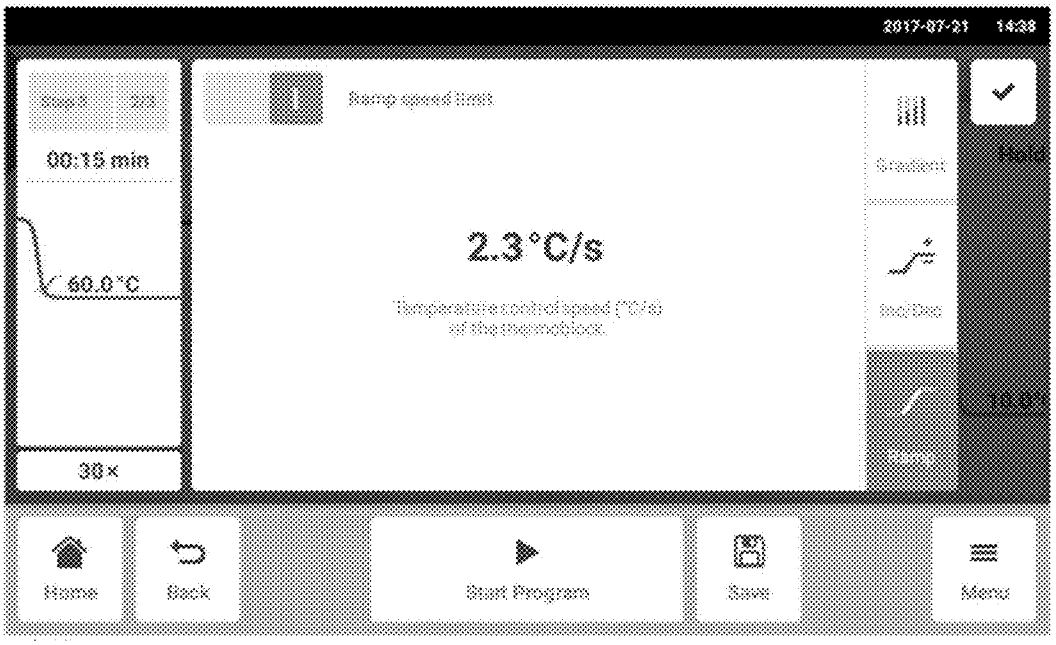
Figure 2C:
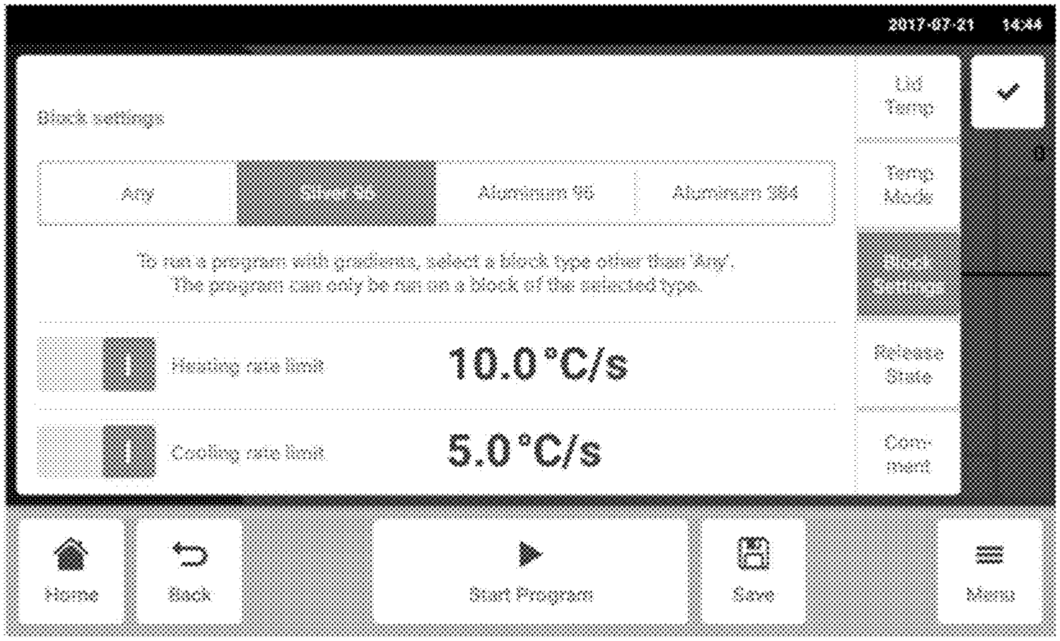

Essential performance parameters of a thermal cycler are the maximum heating rate and the maximum cooling rate, with which a thermal block of the thermal cycler can be tempered. Such a performance value is displayed as an example in FIG. 2*b* and FIG. 2*c*. An additional performance characteristic is the transient behavior during the adjustment of the temperature steps of the thermal block by means of the temperature control. The performance values are characteristic for a thermal cycler resp. a class of thermal cyclers. In general, the transient behavior is optimized for rapidly attaining a temperature step. The corresponding design of the temperature control is specific to the apparatus and not known to the user. Values for the maximum heating rate and the maximum cooling rate are usually indicated in the specifications of the apparatus by the producers. The actual temperature profile at the thermal block of the thermal cycler resp. the temperature profile in the fluid samples, which ultimately shapes the result of the temperature-dependent reaction sequences (e.g. PCR), depends not only on the user-defined tempering schedule but also on said hardware-specific performance values.

Underlying the invention are investigations on commercially available thermal cyclers, in which it has been revealed that the maximum rates of temperature change resp. ramp rates are in most cases not attained or if so, only for a short duration. As displayed in FIG. 3*c*, the knowledge of the maximum temperature change rate, displayed in the figure as the steepest straight line 2, does not allow to immediately infer the time interval of the temperature change, here noted as $\Delta t_{s\_cool}$. In other words, the maximum differential 2 of the temperature curve in the range of the time interval is not equal the difference quotient 1 in the time interval. In the following, the difference quotient in the time interval is termed as the effective temperature change rate resp. the effective heating rate/effective cooling rate. The difference quotient, based on an instant of time t1 (end of the duration of the first temperature step) and a second instant of time t2 (beginning of the duration of the second temperature step) and a first temperature T1(t1) and a second temperature T2(t2), is defined as (T2(t2)−T1(t1))/(t2−t1). In the investigations, it was found that an isolated consideration of the ramp rates provided by the producers is, in most cases, of limited significance and might even lead to wrong conclusions regarding the calculated estimate of the actual PCR run time of a particular thermal cycler. In some cases, the run times of particular thermal cyclers were considerably longer than those that were to be expected according to the ramp rates denoted in the technical specifications of the producers. Minor deviations in the time required for the conclusion of a PCR can occur in principle because of ambient factors (e.g. room temperature, placement of the apparatus, etc.). However, several repeated runs confirmed that such variations are in the range of few seconds. From this, it was concluded that in fact the following aspects are contributing strongly to the observed discrepancies: For the different thermal cyclers, the maximum ramp rates indicated the technical manuals are not attained for various periods of time during the ramp process from one temperature to the next—for certain thermal cyclers possibly only for a short period of time during each ramp phase. Also, the type of temperature control or the setting of the reaction volume can influence significantly on the ramp behavior. This might even result in the necessity of repeating the optimization of a reaction after the transfer of a PCR system from one thermal cycler to another.

For the execution of a PCR, the hardware specific parameters are, in most cases, not taken into consideration by the user. Instead, the temperatures (e.g. by means of a gradient) are optimized for an optimal yield. When migrating a PCR to a different class of thermal cycler, this yield is reduced in most cases. This is due not only to a temperature deviation with respect to the original apparatus, but in particular also to deviations in the dynamical behavior, i.e. in the ramp and during the transient oscillation. Many users eschew switching to a different apparatus in order to avoid the repetition of assays, as this apparatus does not generate the same result despite an equal programming and application of the same tempering schedule. When exchanging the apparatus, e.g. because of a defect or for the renewal of the equipment, a complex re-qualification is required—in particular when changing the type of apparatus—in order to reproduce earlier PCR results with the exchanged hardware. As the control programs of the thermal cycler offer only a limited options for influencing on the control program and the addressing of the hardware components, the re-qualification might also require a complex adjustment of the programming of the control.

The problem at the basis of the invention relates to the reproduction of a temperature profile in a thermal cycler, if a user-defined tempering schedule is repeatedly applied, in particular in a situation, in which the hardware-specific performance values have been altered as it occurs for instance in case of a change of the thermal cycler.

In the preferred embodiment of the invention, the task to be solved is to facilitate for the user the transition from one thermal cycler to another thermal cycler with different performance values. To this aim, the thermal cycler is designed in particular according to the definitions of the present invention.

The invention solves this problem in each case by the method according to claim 1. Preferred embodiments of the invention are subject matter of the subclaims and can also be found in the description and the figures of the invention.

The invention is based on, among others, the observation that for the user the entire run time of the tempering schedule executed on the individual thermal cycler can be determined easily and is in general also logged. The user is attentive to this run time as it represents the essential parameter in the development of the tempering schedule for the determination of the total reaction time resp. for the optimization of the throughput. According to the invention, the user provides a known tempering schedule and a known run time of this tempering schedule.

By applying the invention, a successful reproduction of a temperature profile is rendered more likely. In particular the dynamic behavior, comprising in particular the ramp rates and the transient behavior, of a first thermal cycler can be modeled resp. simulated without the user being subjected to extended efforts in form of experiments and the necessity of inputting a multitude of parameters.

From the run time of a tempering schedule executed on a thermal cycler, the temperature change rates can be determined, i.e. in particular the heating- and cooling rates, which the tempering device of the thermal cycler uses for attaining the individual temperature step.

In this case, the run time comprises at least one hold time of the at least one temperature step of the tempering schedule as well as at least one time interval, during which the adjustment of this at least one temperature step is executed in function of at least one temperature change rate. If, for example, one assumes that a thermal cycler uses always the same cooling rate for the cooling between corresponding temperature steps and always the same heating rate for the heating between corresponding temperature steps, then the run time T of a tempering schedule composed of repetitions of the same temperature cycle results from the time intervals $\Delta t_{S\_heat}$ of the heating and the hold times $T_{S\_heat}$ at this higher temperature level as well as the time intervals $\Delta t_{S\_cool}$ of the cooling and the hold times $T_{S\_cool}$ at this lower temperature level:

$$T = \sum_{S_{heat}=1}^{n} (T_{S_{heat}}| + \Delta t_{S_{heat}}) + \sum_{S_{cool}=1}^{m} (T_{S_{cool}}| + \Delta t_{S_{cool}})$$

$$T = \sum_{S_{heat}=1}^{n} \left(T_{S_{heat}} + \frac{\Delta_{S_{heat}}}{r_H}\right) + \sum_{S_{cool}=1}^{m} \left(T_{S_{cool}} + \frac{\Delta_{S_{cool}}}{r_C}\right)$$

In this, $r_H$ is the temperature change rate (heating rate) for heating the tempering block by the temperature difference $\Delta_{S\_heat}$, and $r_C$ is the temperature change rate (cooling rate) for cooling the tempering block by a temperature difference $\Delta_{S\_cool}$.

In the context of the present patent application, unless noted differently, the terms heating rate, cooling rate, and temperature change rate refer to the effective heating rate, the effective cooling rate, and the effective temperature change rate, respectively, and not to extreme values that are present for a short time for example during a change of temperature. For most commercially available thermal cyclers, the effective heating rate and the effective cooling rate are in an approximately constant ratio. This can be determined easily for known thermal cycler and can be stored as a table. This table can be stored in a data storage device of the thermal cycler resp. of the method according to present invention. In most cases, the heating rate is larger than the cooling rate. This ratio can—in many cases—be approximated with sufficient precision with the statement $r_H=2*r_C$ for thermal cyclers. In these cases, the effective cooling rate, resp. the effective heating rate can be calculated from the run time as follows:

$$T = \sum_{S_{hea}=1}^{n} \left(T_{S_{heat}} + \frac{\Delta_{S_{heat}}}{2r_C}\right) + \sum_{S_{cool}=1}^{m} \left(T_{S_{cool}} + \frac{\Delta_{S_{cool}}}{r_C}\right)$$

$$T = \sum_{S_{heat}=1}^{n} \left(T_{S_{heat}} + \frac{\Delta_{S_{heat}}}{2}\frac{1}{r_C}\right) + \sum_{S_{cool}=1}^{m} \left(T_{S_{cool}} + \Delta_{S_{cool}}\frac{1}{r_C}\right)$$

$$T = \sum_{S_{heat}=1}^{n} T_{S_{heat}} + \frac{1}{r_C}\sum_{S_{heat}=1}^{n} \frac{\Delta_{S_{heat}}}{2} + \sum_{S_{cool}=1}^{m} T_{S_{cool}} + \frac{1}{r_C}\sum_{S_{cool}=1}^{m} \Delta_{S_{cool}}$$

$$T = \sum_{S_{heat}=1}^{n} T_{S_{heat}} + \sum_{S_{cool}=1}^{m} T_{S_{cool}} + \frac{1}{r_C}\left(\sum_{S_{hea}=1}^{n} \frac{\Delta_{S_{hea}}}{2} + \sum_{S_{cool}=1}^{m} \Delta_{S_{cool}}\right)$$

$$T - \sum_{S_{heat}=1}^{n} T_{S_{heat}} - \sum_{S_{cool}=1}^{m} T_{S_{cool}} = \frac{1}{r_C}\left(\sum_{S_{heat}=1}^{n} \frac{\Delta_{S_{heat}}}{2} + \sum_{S_{cool}=1}^{m} \Delta_{S_{cool}}\right)$$

$$\boxed{\begin{gathered} r_C = \frac{\sum_{S_{heat}=1}^{n} \frac{\Delta_{S_{heat}}}{2} + \sum_{S_{cool}=1}^{m} \Delta_{S_{cool}}}{T - \sum_{S_{heat}=1}^{n} T_{S_{heat}} - \sum_{S_{cool}=1}^{m} T_{S_{cool}}}, \\ r_H = 2r_C \end{gathered}},$$

depending on that $$T > \sum_{S_{heat}=1}^{n} T_{S_{heat}} - \sum_{S_{cool}=1}^{m} T_{S_{cool}}$$

Figure 2D:
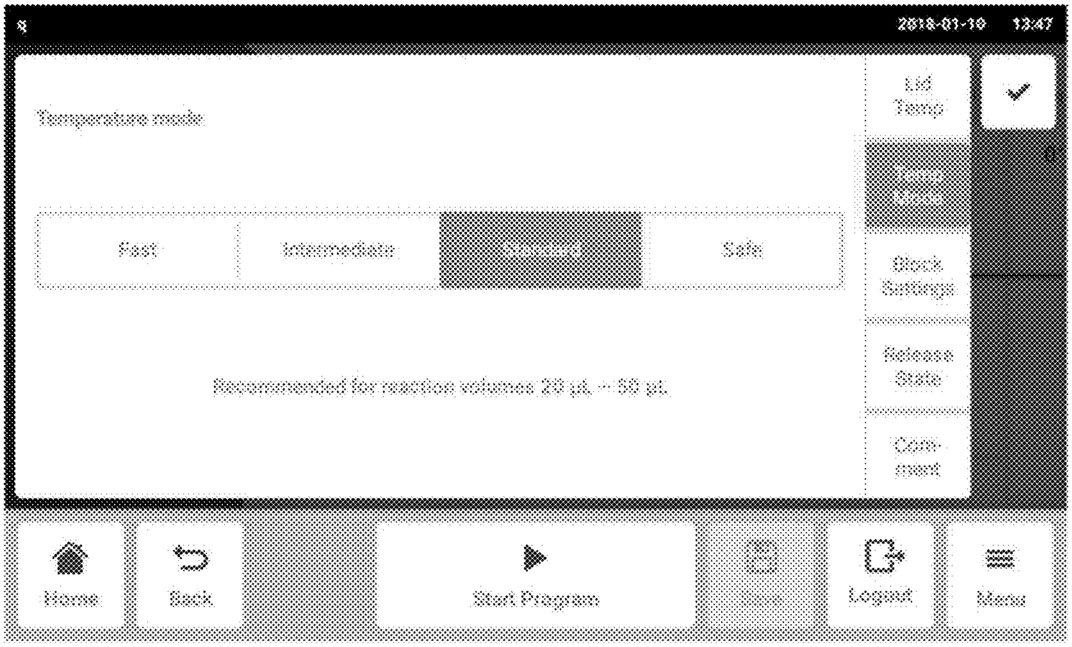

This calculation or a calculation with a comparable result, in particular the calculation of the framed cooling rate and the heating rate, is executed preferentially by an evaluation program executable on a computer resp. on a data processing device of a thermal cycler according to the present invention. The temperature change rates are determined in particular assuming an average transient behavior (standard). This is displayed in an example in FIG. 2*d*. This affects the input variables $\Delta_{S\_heat}$, $\Delta_{S\_cool}$, $T_{S\_heat}$, and $T_{S\_cool}$ (for all s).

In an approximation, it can be assumed that the time intervals of the heating and cooling each comprise a constant time period (period of the transient oscillation) that takes into account the transient oscillation of the control circuit to the respective level of the temperature step. The period of the transient oscillation is identified as the time between the presence of the constant temperature change rate and the presence of the temperature level to be adjusted. Alternatively, the period of the transient oscillation can be determined for certain commercial thermal cyclers and be stored in a table. Furthermore, a table can contain a preselection of a limited selection of typical control modes. The table can be stored in a data storage device in the thermal cycler resp. the method according to the present invention. Alternatively or additionally, the thermal cycler resp. the method according to the present invention can be configured such that the user—in particular by input via a user interface device of the thermal cycler and a data input occurring this way—alters the constant value of the period of the transient oscillation as a variable. By this, the user can easily correct the result by means of an alteration of the transient behavior if the yield of the method is not correct.

In principle, a temperature control of the tempering block of a thermal cycler optimized for the controlled transient oscillation is known. The transient oscillation at a desired set temperature of a temperature step of the temperature cycle employs in the case of heating an overshoot of the temperature applied in the tempering block to a maximum temperature value, which is higher than the set value to be adjusted, followed by an undershoot to a temperature value below the set value, in order to switch back to a smaller temperature value above the set value etc., until the set value is attained. The transient oscillation can then be characterized by the temperature difference of the maximum temperature of the overshoot (in case of cooling: the minimum temperature of the undershoot) and the duration of the overshoot until the set temperature is reached. In the case of a rapid transient oscillation, this temperature difference and the duration are each small. The user can be given in particular a preselection of a limited number of modes of the transient oscillation to choose from. Each such mode of the transient oscillation may be characterized by specific values for the said temperature difference and duration, respectively for heating and cooling, i.e. by two pairs of values each: Mode_x: (temperature_difference_x, duration_x)$_{Heat}$, (temperature_difference_x, duration_x)$_{Cool}$. Such modes can be offered to the user by list selection via display, for example under the designation "Fast", "Intermediate", "Standard", "Safe", as provided in the embodiment example of FIG. 2*d*. Details for the implementation of such temperature controls using overshoot are known, for example, from EP 0 488 769 A2, described there as a "controlled overshoot algorithm". The temperature control may further be executed by additionally observing the effect of the temperature control on the temperature of the fluid sample contained in the vessel inserted into the thermal block of the thermal cycler, such as known from EP 1 452 608 B1.

The method according to the present invention and/or the thermal cycler according to the present invention can be configured such that a certain commercial thermal cycler $TC_x$ can be selected—in particular via a user interface device of the thermal cycler—by the user, for instance by a list selection that can be displayed and operated on a display resp. a touchscreen of the user interface device. The thermal cycler resp. the method has then the additional information available that the runtime T indicated by the user refers to the execution of the tempering schedule on the thermal cycler of type $TC_x$. Since the method according to the present invention and/or the thermal cycler according to the present invention can access the tables, in which the ratio $r_H/r_C$ resp. the duration of the transient oscillation is stored as a function of $TC_x$, the calculation of the temperature change rates can be executed automatically after the user has selected the TCX.

According to the present invention, the method serves for determining at least one temperature change rate for controlling the tempering device of a thermal cycler, in which the control tempers a samples-receiving thermal block of the thermal cycler for performing polymerase chain reactions in those samples according to a tempering schedule, during which the temperature is changed between temperature levels by changing the temperature with a temperature change rate, comprising the steps:

Providing tempering schedule data that is determining the hold time and the temperature of at least one temperature step of the tempering schedule;

Providing run time data that is determining the run time required for the execution of the tempering schedule on a thermal cycler, Determination of the at least one temperature change rate by means of an evaluation program using the tempering schedule data and the run time data;

Providing the at least one, previously determined, temperature change rate for controlling the tempering device of the thermal cycler in function of said at least one temperature change rate.

Preferentially, the tempering schedule data determines at least a first hold time and a first temperature of a first temperature step and at least a second hold time and a second temperature of a second temperature step of the tempering schedule. Typically, if it concerns a PCR, a cycle of the tempering schedule also comprises three temperature steps, so that the tempering schedule data also determines a third hold time and a third temperature of the third temperature step. The first temperature is assumed to be higher than the second temperature, and the temperature is changed between temperature levels according to the tempering schedule by cooling at a first temperature change rate (cooling rate) starting from the first temperature and by heating at a second temperature change rate (heating rate) starting from the second temperature.

Preferentially, the evaluation program determines the at least one first temperature change rate from the tempering schedule data and the run time data, which is used as the cooling rate for the adjustment of the second temperature level, and the evaluation program determines at least one second temperature change rate, which is used for the adjustment of the first temperature level. These at least one cooling rate and at least one heating rate are provided preferentially for controlling the tempering device of the thermal cycler.

During a cycle of the tempering schedule, there is in particular at least one time interval, in which at least one constant temperature change rate is applied and which can also comprise a period of the transient oscillation that can be identified as the time between the presence of the constant temperature change rate and the presence of the temperature level to be adjusted, in which the control of the tempering device of the thermal cycler performs a transient oscillation during this time interval, which is part of the temperature control of a thermal cycler, in which the method comprises the step:

Providing transient oscillation data that comprises information on at least one period of the transient oscillation, in which in particular also the transient oscillation data is used in the determination of that at least one temperature change rate by the evaluation program.

Preferentially, the method comprises the step:

Providing said transient oscillation data by input of a user at a user interface device of a data processing device by means of which the evaluation program is executed.

The run time may further include a latency interval during which, at the beginning of a tempering schedule, a heatable lid covering the tempering block of the thermal cycler, that contains the samples while the polymerase chain reaction is performed, is first adjusted to a set temperature, wherein the run time data also includes the information on this latency interval.

The method according to the present invention is used preferentially for controlling the tempering device of a thermal cycler, wherein the method for controlling the tempering device comprises preferentially a method for the determination of at least one temperature change rate from run time data and tempering schedule data. In this, the thermal cycler comprises the tempering device for tempering a sample-receiving thermal block in order to perform polymerase chain reactions in these samples according to the tempering schedule described in the method according to the present invention, and comprises an electronic control device that is configured for controlling the tempering device by means of control parameters. In this, the method of controlling the tempering device of a thermal cycler comprises the steps of the method for the determination of at least one temperature change rate from run time data and from tempering schedule data, and the following steps:

Using the at least one, previously determined, temperature change rate for the determination of control parameters, which comprise said at least one temperature change rate, and which determine a tempering control schedule corresponding to the tempering schedule;

Controlling the tempering device by means of the control parameter and the electronic control device in order to execute the tempering control schedule using said at least one temperature change rate.

The method for controlling the tempering device is in particular a method for controlling a first thermal cycler by simulating the tempering behavior of a second thermal cycler, in which the method for controlling the tempering device comprises the method for determining at least one temperature change rate from tempering schedule data and run time data, which characterize the tempering behavior of the second thermal cycler. In this, in particular the first thermal cycler can be operated with a first maximum temperature change rate, which is a cooling rate or a heating rate, and the second thermal cycler can be operated in particular with a second maximum temperature change rate, which is a cooling rate or a heating rate, in which the first maximum temperature change rate is greater than or equal to the second maximum temperature change rate. Briefly, the first thermal cycler tempers preferentially faster than the second thermal cycler. An example of such a thermal cycler with a maximum effective heating and cooling rate being greater than most maximum effective heating and cooling rates of other commercially available thermal cyclers is the Mastercycler® X50 of the Eppendorf AG, Hamburg, Germany. The Mastercycler® X50 heats at a maximum rate of 10° C./s and cools with a maximum rate of 5° C./s.

In this, the first thermal cycler comprises the tempering device for tempering a sample-receiving thermal block in order to perform polymerase chain reactions in these samples according to the tempering schedule defined by the method for the determination of at least one temperature change rate, and comprises an electronic control device that is configured for controlling the tempering device. The method for controlling the tempering device comprises in particular the steps of the method for the determination of at least one temperature change rate from the tempering schedule data and the run time data, and the following steps:

Using the at least one, previously determined, temperature change rate for the determination of control parameters, which comprise said at least one temperature change rate, and which determine a tempering control schedule corresponding to the tempering schedule;

Controlling the tempering device by means of the control parameter and the electronic control device in order to execute the tempering control schedule using said at least one temperature change rate.

In this, the at least one temperature change rate is in particular smaller than the first maximum temperature change rate.

The invention related to a thermal cycler, in particular for performing polymerase chain reactions in laboratory samples, comprising:

a tempering device for tempering a sample-receiving thermal block according to a tempering schedule, during which the temperature is changed between temperature levels by changing the temperature at the thermal block with a temperature change rate;

an electronic control device that comprises a data processing device and that is configured for controlling the tempering device in order to execute the following steps:

Use of tempering schedule data determining the tempering schedule, and of run time data determining the run time of the tempering schedule and using the at least one, previously determined according to the method according to any one of claims 1 to 5, temperature change rate for the determination of control parameters, which comprise said at least one temperature change rate, and which determine a tempering control schedule corresponding to the tempering schedule;

Controlling the tempering device by means of the control parameter and the electronic control device in order to execute the tempering control schedule using said at least one temperature change rate.

The electronic control device of the thermal cycler is configured in particular for the execution of the method for determining at least one temperature change rate from the tempering schedule data and the run time data, in which the electronic control device is configured to execute an evaluation program using the data processing device of the control device, and which is configured to execute the following steps:

Acquisition of tempering schedule data that is determining the hold time and the temperature of at least one temperature step of the tempering schedule;

Acquisition of run time data that is determining the run time required for the execution of the tempering schedule on a thermal cycler, Determination of the at least one temperature change rate by means of the evaluation program using the tempering schedule data and the run time data;

Using the at least one temperature change rate determined by the evaluation program for controlling the tempering device of the thermal cycler in function of said at least one temperature change rate.

The data processing device of the electronic control device comprises preferentially an interface device, by means of which a data connection with an external data processing device can be established, with the method for determining the at least one temperature change rate from the tempering schedule data and the run time data being executed in particular on this external data processing device, in order to provide at least one temperature change rate, with the data processing device of the electronic control device being configured to receive this at least one temperature change rate, in particular also the tempering schedule data and/or the run time data, via the data connection.

Preferentially, the thermal cycler comprises a user interface device, with the electronic control device being configured to acquire the tempering schedule data entered by a user via the user interface device, and to acquire the run time data entered by a user via the user interface device.

Furthermore, the invention relates to a program code that executes the following steps if it is executed by means of a data processing device, in particular the data processing device of an electronic control device of a thermal cycler:

- Acquiring tempering schedule data that are in particular entered by the user via a user interface device connected to a data processing device, which in particular part of the thermal cycler, and that is determining the hold time and the temperature of at least one temperature step of the tempering schedule;
- Acquiring run time data that are in particular entered by the user via a user interface device connected to a data processing device, which in particular is part of the thermal cycler, and that is determining the run time required for the execution of the tempering schedule on a thermal cycler,
- Determination of the at least one temperature change rate by means of the evaluation program using the tempering schedule data and the run time data, and being executed in particular by the data processing device;
- Providing the at least one temperature change rate determined by the evaluation program for controlling the tempering device of the thermal cycler in function of said at least one temperature change rate;
- Using the at least one, previously determined, temperature change rate for the determination of control parameters, which comprise said at least one temperature change rate, and which determine the tempering control schedule;
- Controlling the tempering device by means of the control parameter and the electronic control device in order to execute the tempering control schedule using said at least one temperature change rate.

The invention also relates to the use of the method for determining at least one temperature change rate from the tempering schedule data and the run time data for controlling the tempering device of a first thermal cycler by simulating the tempering behavior of a second thermal cycler. The simulation supports the user in the migration from older, weaker second thermal cyclers to stronger first thermal cyclers.

A thermal cycler is an apparatus that is able to adjust the temperature of at least one sample in a chronological order to a predetermined level and to maintain it at this temperature level for a predetermined hold time. The succession of this temperature control is cyclic. This means that a predetermined temperature cycle, i.e. a sequence of at least two temperature steps is executed repeatedly. This method is used in particular for performing a polymerase chain reaction (PCR).

A thermal cycler, in particular the treatment device of a thermal cyclers, comprises preferentially a thermal block. A thermal block is a sample holder made of a heat conducting material, in most cases a metal-containing material or a metal, in particular aluminum or silver. The sample holder comprises a contacting surface that is contacted by at least one heating/cooling device of the thermal cycler, in particular at least one Peltier element, preferentially several, in particular six Peltier elements.

The thermal cycler, in particular the treatment device of the thermal cycler, comprises a control device with at least one control circuit with the heating/cooling device being assigned as actuator and at least one temperature measurement device being assigned as measuring element. The temperature of a temperature step is controlled by means of the control device. A heat sink of the thermal cycler is used for the cooling of sections of the thermal cycler, in particular for cooling the Peltier elements.

The thermal cycler, in particular the treatment device of the thermal cycler, can comprise additional heating and/or cooling elements. Preferentially, the thermal cycler, in particular the treatment device of the thermal cycler, comprises timer device, by means of which the temporal parameter of adjusting the temperature cycle can be controlled. In a thermal cycler, the instrument-controlled treatment of the at least one laboratory sample corresponds to a temperature cycle treatment, to which the at least one sample is subjected. Possible parameters, in particular program parameters, in particular user parameters, which are used for influencing on the temperature cycle treatment in the tempering schedule, define in particular the temperature of a temperature step, the hold time of a temperature step, the control of additional heating and/or cooling elements, and/or the number of temperature steps or cycles, and/or at least one process sequence parameter that influences or defines the process sequence, in particular the succession, of a temperature control program consisting of several steps.

The thermal cycler comprises in particular an electronic control device. In the framework of the present invention, a control device comprises in general in particular a data processing device, in particular a processing unit (CPU) for processing data, and/or a microprocessor, or is a data processing device. The control device resp. the processing unit of the control device of a thermal cycler is configured preferentially for the program-based control of the tempering of the thermal block.

The data processing device comprises preferentially a processing unit, in particular a CPU, furthermore additionally at least one data storage device, in particular for the volatile and/or permanent storage of data. The data processing device is designed preferentially for establishing a data connection to an external computer or laboratory apparatus, in particular a thermal cycler, via an interface device.

Using a thermal cycler for the cyclic tempering of laboratory samples, in particular for performing a PCR in these laboratory samples, is an instrument-controlled treatment, thus in particular an at least partially automated treatment. In the case of a partially automated treatment, it is in particular possible for the treatment to be performed in such a way that, after starting the treatment and before ending the treatment, at least one user input is made with which the user can influence the ongoing treatment, in particular by answering, for example, an automatic query made via a user interface device of the thermal cycler, in particular by confirming or denying an input or making other input. In the case of the partially automated treatment, it is in particular possible for the treatment to comprise several treatment steps, which are performed automatically in particular in temporal succession, and which comprise at least one treatment step that requires a user input, in particular a user input made via a user interface device. Here, examples for such user inputs to a thermal cycler are the input of tempering schedule data, the input of the run time, and/or optionally the input resp. the selection of a thermal cycler $TC_x$ assigned to the entered run time.

The instrument-controlled treatment is preferentially a program-controlled treatment, thus a treatment that is controlled by a program. A program controlled treatment is to be understood as the process of the treatment being carried out essentially by executing a plurality or a multitude of program steps. Preferentially, the program-controlled treatment occurs by making use of at least one program parameter, in particular at least one program parameter selected by the user. A parameter selected by the user is also termed a user parameter. Typical user parameters for a thermal cycler determine the tempering schedule, in particular the height and the hold time of the temperature steps of a tempering schedule, the total number of cycles, as well as—in the framework of the present invention—the run time of the tempering schedule that is known to the user from earlier thermal cycler applications of the same tempering schedule. The program-controlled treatment is preferentially supported by a digital data processing device, which can be in particular a component of the control device of the laboratory apparatus. The data processing device can comprise at least one processor, i.e. a CPU, and/or at least one microprocessor. The program-controlled treatment is controlled and/or executed preferentially according to the specifications of a program, in particular a control program. In particular, essentially no user action is required in the case of a program-controlled treatment, at least after acquiring the user-required program parameters.

A program parameter is to be understood as a variable that can be set in a predetermined way within program or a subprogram, being valid for at least one execution (call) of the program or subprogram. The program parameter is assigned e.g. by the user and controls the program or the subprogram and effectuates a data output in function of that program parameter. The program parameter influences and/or controls and/or the data output by the program control in particular the control of the apparatus, in particular the control of the treatment by means of the at least one treatment device.

A program parameter can be a user-required program parameter. A user-required parameter is characterized by the fact that it is required for executing of a treatment. Other program parameters, which are not user-required, can be derived from the user-required program parameters or can be made available differently, in particular optionally be set by the user. The setting of a program parameter by a user is carried out in particular by displaying a selection of possible specified values from a list of specified values stored in the laboratory apparatus, in which the user selects the desired value from this list and thus sets it. This applies, for example, to the selection of a thermal cycler $TC_x$, which is assigned by the user to a known run time of the tempering schedule. It is also possible that this program parameter is set by the user entering the value, e.g. by entering a number that corresponds to the desired value via a numeric keypad, or by the user increasing or decreasing a value continuously or by increments until it corresponds to the desired value, and thus setting the value in this way. Other forms of input, e.g. by voice control and/or gesture control, are conceivable.

A program is to be understood in particular as a computer program. A program is a sequence of commands, consisting in particular of declarations and instructions, in order to be able to execute and/or solve a certain functionality, task or problem on a digital data processing system. In general, a program is present as a software that is used with a digital data processing system. In particular, the program may be present as a firmware, in the case of the present invention in particular as a firmware of the control device of the laboratory apparatus. In most cases, the program is present on a data storage medium in the form of an executable program file, often in the so-called machine code, that is loaded for execution into the main memory of the computer of the digital data processing system. The program is processed as a sequence of machine—i.e. processor—commands by the processor/processors of the computer and thus executed. A 'computer program' is understood to include, in particular, the source code of the program from which the executable code may be generated in the course of controlling the laboratory apparatus.

A control program is to be understood as an executable computer program that controls and/or executes the desired treatment of the at least one sample, in particular in function of at least one program parameter. This program parameter can be a program parameter that is influenced and/or set by the user. The treatment can be controlled in particular by the control device generating one or several control parameters in function of the program parameters, by means of which the at least one treatment device is controlled. Preferentially, the laboratory apparatus comprises an operating system that may be or may comprise a control program. The control program can in particular designate an operating system of the laboratory apparatus or be a component of the operating system. The operating system controls the treatment and other operating functions of the laboratory apparatus. The control program can also be determined by control parameters that can be derived by the control device from program parameters resp. user parameters.

The control program can be signal-connected in particular to the user interface device and/or can control the user interface device. The control device of the user interface device can be integrated into the control device of the laboratory apparatus or it can be designed as being separated from this control device. The control device of the user interface device can be integrated into the control of the laboratory apparatus, can be controllable by the control program, and/or can be integrated in particular into the control program. The control program can control other, preferentially provided functions of the laboratory apparatus, for example an energy saving function of the laboratory apparatus or a communication function for communicating with external data processing devices, which are provided in particular separately from the laboratory apparatus, and which in particular are not a component of the laboratory apparatus.

The thermal block of the thermal cycler comprises in particular a plurality of intakes for sample containers. The control device of the thermal cycler can be configured to acquire an information in form of sample container data that is associated with the run time and the tempering schedule. For example, it is possible that the user has performed a thermocyclically controlled reaction, in particular a PCR, on an older thermal cycler $TC_x$ with a certain number of sample containers of a certain type containing a certain number and a certain volume of laboratory samples being arranged in the thermal block of the thermal cycler $TC_x$.

The evaluation program can be configured to consider such sample container data, in particular the number of sample containers, the type of the sample container(s), number/volume of laboratory samples, in determining the at least one temperature change rate from the run time data and the tempering schedule data.

A sample container can be a single container, in which only a single sample is contained, or it can be a multicontainer, in which several single containers are connected to each other.

A single container can be an open container or a closable container. In the case of a closable container, the cover element, in particular a closure cap, can be provided. The cover element can be connected firmly connected to the container, e.g. as a hinged cover or hinged closure cap, or can be used as a separate component.

In a multicontainer, the several single container are preferentially arranged in fixed relative positions, in particular corresponding to the crossing points of a grid pattern. This simplifies the automated control of the positions and in particular the individual addressing of samples. A multicontainer can be designed as a plate element, in which the single containers are connected in such a way that they form a plate-shaped arrangement. The single containers can be designed as dents in a plate or can be connected with each other via rack elements. The plate element can comprise a frame element, in which the single containers are held. These connections of components can be integral connections, i.e firmly bonded connections and/or connections produced in a common injection molding process, or produced as force-fit and/or form-fit. The plate element can be in particular a microwell plate.

Multicontainers can comprise a multitude (from 2 to 10) single containers. Furthermore, they can comprise a multitude of single containers (more than 10), typically 12, 16, 12, 16, 24, 32, 48, 64, 96, 384, 1536 single containers. The multicontainer can be in particular a microwell plate. A microwell plate can be designed according to one or several industry standards, in particular the industry standards ANSI/SBS 1-2004, AN-SI/SBS 2-2004, ANSI/SBS 3-2004, ANSI/SBS 4-2004.

The maximum sample volume that a sample container can take in is typically in the range between 0.01 ml and 100 ml, in particular at 10-100 µl, 100-500 µl, 0.5-5 ml, 5-25 ml, 25-50 ml, 50-100 ml, depending on the type of transport container or sample container selected.

The sample container consists preferentially partially or completely of plastic. It is preferentially a disposable item that is used typically only for one treatment or for a small number of treatment steps of the sample. However, the sample container can also consist partially or completely of a different material.

Preferred embodiments of the thermal cycler according to the present invention can be inferred in particular from the description of one of the methods according to the invention. Preferred embodiments of the method according to the present invention can be inferred in particular from the description of the thermal cycler according to the present invention. Other preferred embodiments of the method and the thermal cycler according to the present invention can be inferred from the description of the embodiment examples according to the figures.

Figures 1A, 1B:
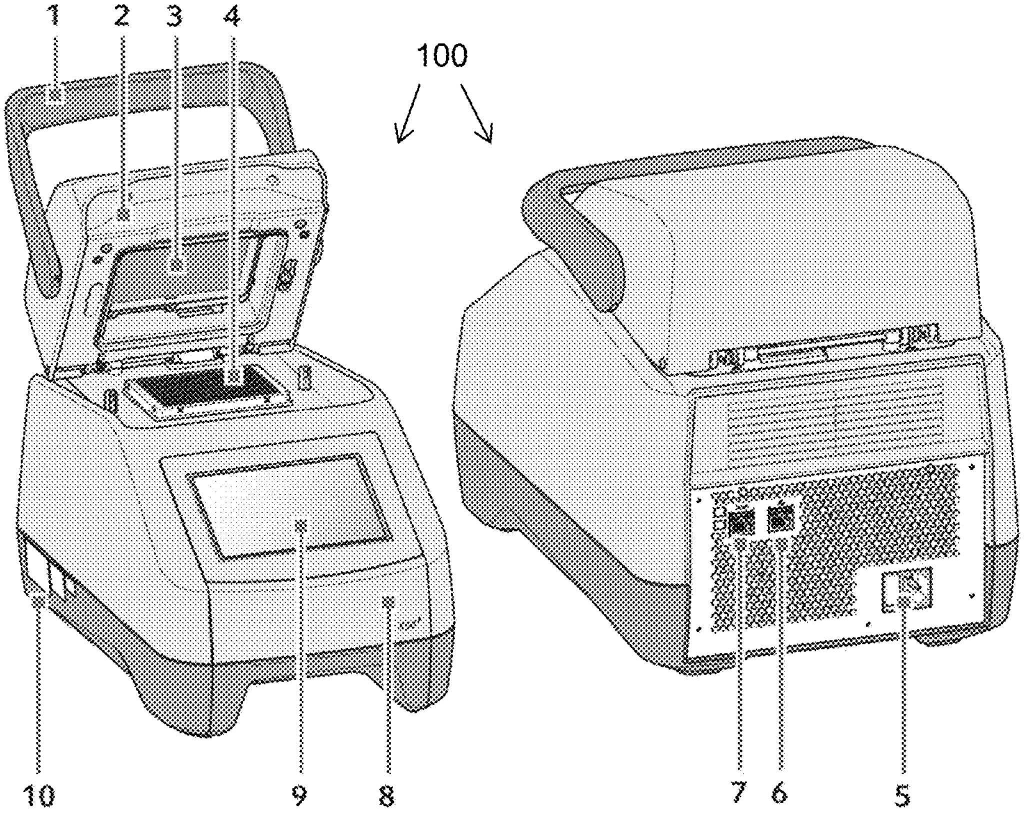

In the figures:

FIG. 1*a* depicts a perspective front view of a thermal cycler according to the present invention in an embodiment example.

FIG. 1*b* depicts a perspective back view of the thermal cycler from FIG. 1*a*.

FIG. 2*a* to 2*e* each depict screen contents, which can be displayed on the screen of the thermal cycler from FIGS. 1*a* and 1*b*.

Figure 2E:
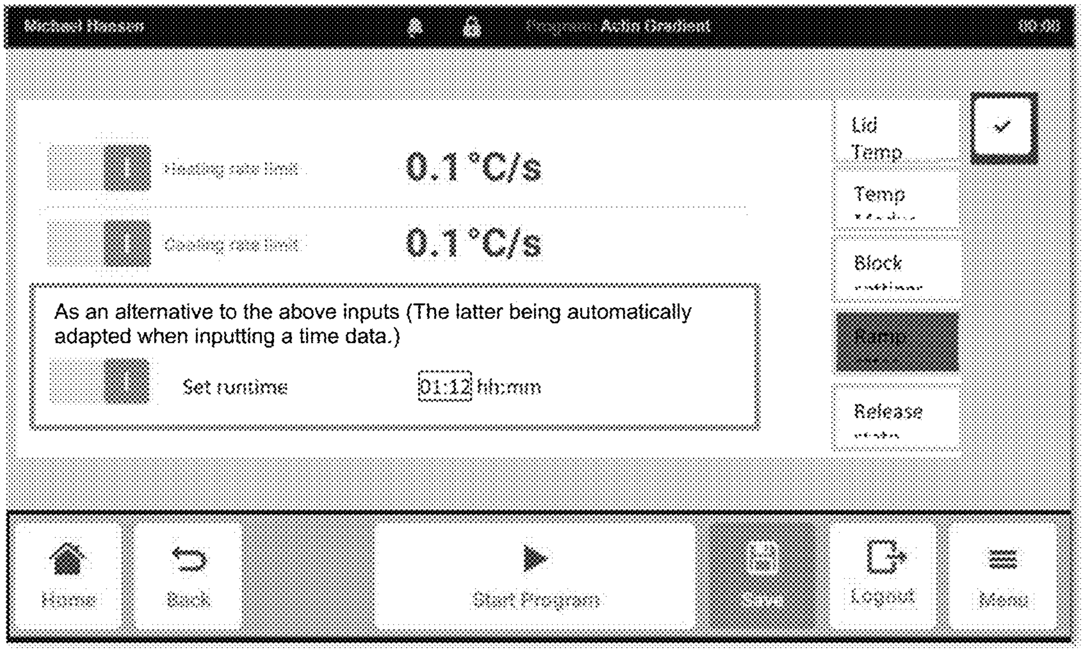

FIG. 2*e* depicts a screen input dialog, in which the user can enter the known run time of the tempering schedule after having entered the tempering schedule. The thermal cycler autonomously calculates the temperature change rates from the run time.

Figure 3A:
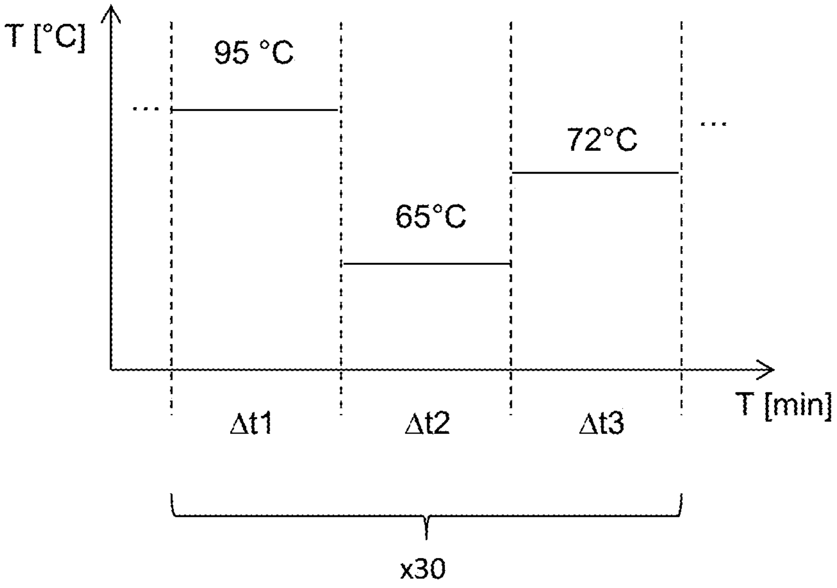

FIG. 3*a* depicts an example of a tempering schedule defined by the user, which is defined in the thermal cycler or the method according to the present invention in particular by the tempering schedule data.

Figure 3B:
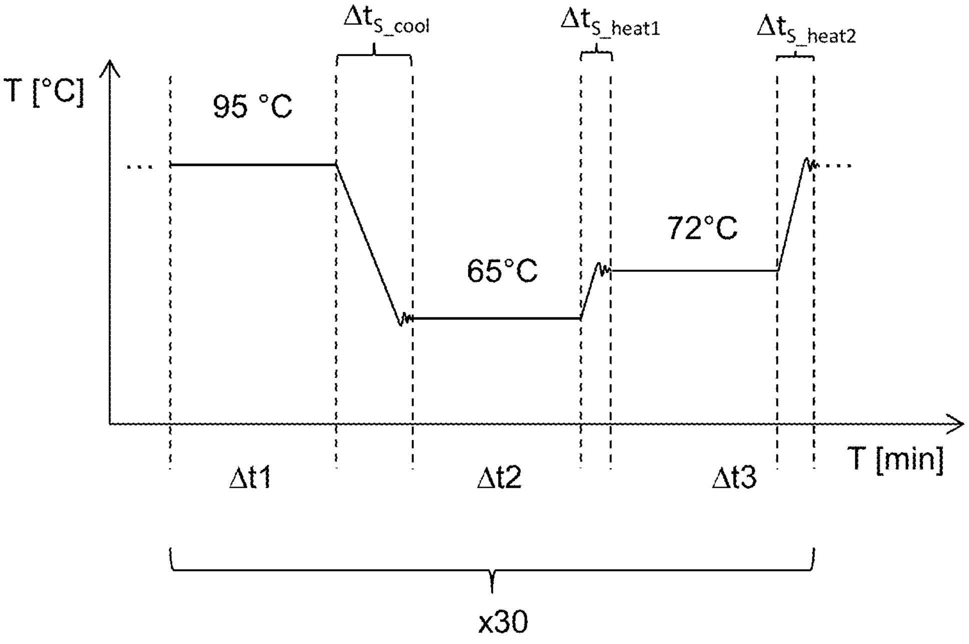

FIG. 3*b* schematically depicts a tempering control schedule that is calculated by the thermal cycler or the method according to the present invention from the run time and the tempering schedule data from FIG. 3*a*.

Figure 3C:
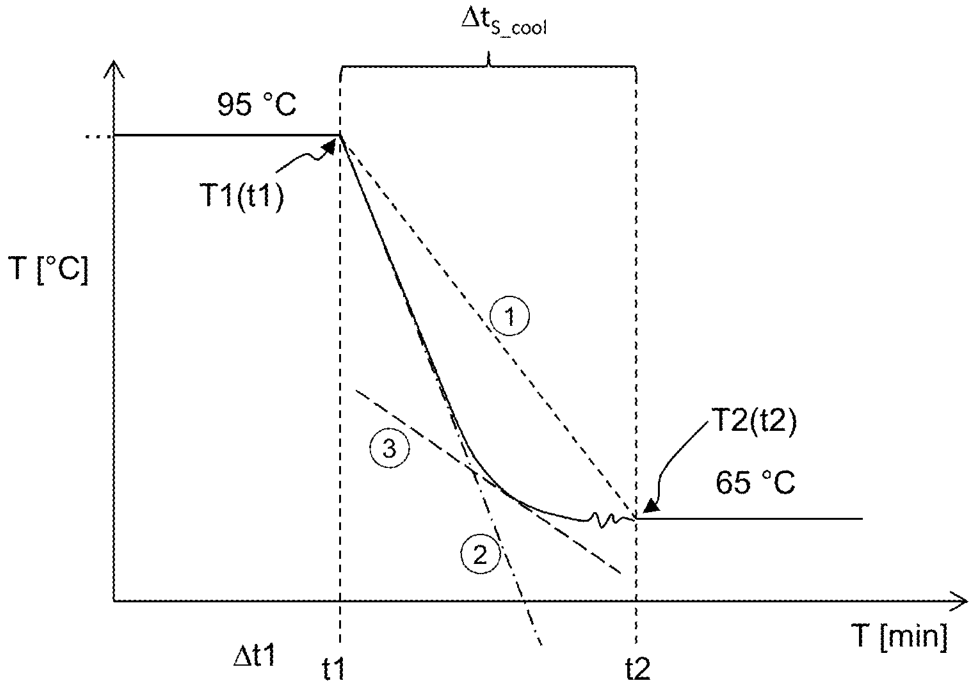

FIG. 3*c* schematically depicts the temperature profile when changing between two temperature levels, indicating the effective cooling rate as difference quotient and the maximum cooling rate as maximum differential.

Figure 4:
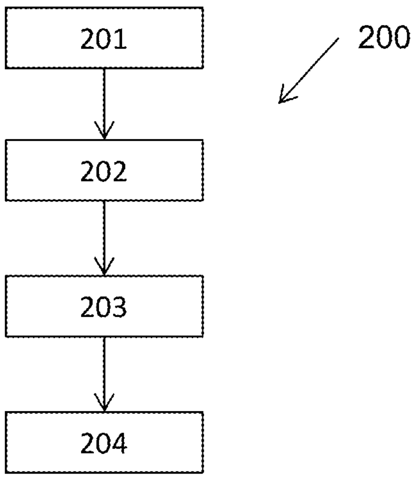

FIG. 4 schematically depicts the process sequence of an example of the method according to the present invention for determining at least one temperature change rate from the tempering schedule data and the run time data.

Figure 5:
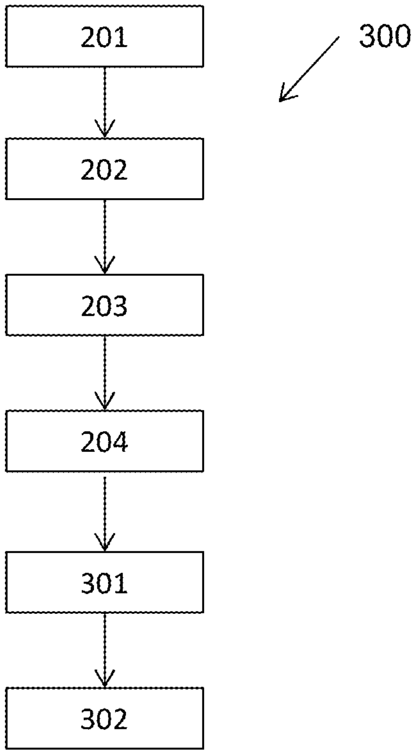

FIG. 5 schematically depicts the process sequence of an example of the method according to the present invention for controlling a thermal cycler using the steps of the method for determining at least one temperature change rate from the tempering schedule data and the run time data from FIG. 3.

FIG. 1*a* depicts a perspective front view of a thermal cycler 100 according to the present invention in an embodiment example. On the outside, the thermal cycler 100 is characterized by a lid handle 1 for closing and opening the heating lid, the heating lid 2, the heating plate 3 that is located in the heating lid and that can be heated to ca. 105° C. for avoiding condensation on the insides of the sample containers, the aluminum thermal block 4 with (here) 385 intakes for taking in PCR containers, in particular a 384 microwell plate, which is contacted from underneath (not visible) with six Peltier elements that constitute the tempering elements of the tempering device of the thermal cycler for heating and cooling the thermal black and that are contacted at their undersides (not visible) by a heat sink to dissipate the excess heat of the heat pumps to the surroundings, a mains connection socket with mains switch 5, a connection socket for Ethernet 6, a connection socket for the data exchange with another thermal cycler 7, a cover 8 for covering a USB socket, a touchscreen 9 operating as user interface device, a name plate 10. Alternatively, a 96 Aluminum or Silver block can be used as exchangeable thermal block.

The thermal cycler 100 comprises a control device with a program-controlled microprocessor (not depicted), that is configured for executing the steps of the methods 200 and 300 according to the present invention in that the control program of the thermal cycler 100 is programmed to be able to execute these steps.

FIG. 3*a* depicts a typical tempering schedule that could have been defined by the user via the touch screen 9 (for example, see FIG. 2*a*). It comprises the desired (here: three)

temperature steps 95° C., 65° C., 72° C. and their hold times Δt1, Δt2, Δt3 of one cycle that is to be repeated successively 30 times ("×30").

FIG. 3*b* depicts a typical tempering control schedule, which, here, has been calculated by the control device of the thermal cycler from the tempering schedule data according to FIG. 3*a* and the run time data entered by the user. The tempering control schedule comprises the time intervals $\Delta t_{S\_cool}$, $\Delta t_{S\_heat1}$ and $\Delta t_{S\_heat2}$. In the time interval $\Delta t_{S\_cool}$ the average temperature measured at the tempering block by the temperature sensors of the tempering device is cooled from 95° C. to 65° C., for example with a cooling rate of 1.0° C./sec, which corresponds to the maximum cooling rate of an older, previously used thermal cycler $TC_x$ that, for executing, required the run time now entered by the user. Correspondingly, in the time interval $\Delta t_{S\_heat1}$ the temperature is raised from 65° C. to 72° C., e.g at a heating rate of 2.0° C./sec, which corresponds to the maximum heating rate of the older, previously used thermal cycler $TC_x$ that, for executing, required the run time now entered by the user. In the time interval $\Delta t_{S\_heat2}$ the temperature is raised from 72° C. to 95° C., e.g. at a heating rate of 2.0° C./sec, so that the cycle can start over. The thermal cycler according to the present invention exhibits a greater maximum heating and cooling rate, namely 10° C./sec and 5° C./sec, so that it can easily execute the calculated heating and heating and cooling rates of the older devices. The duration of the transient oscillation according to a standard transient control is also included in the time interval in each case. As a result, the thermal cycler according to the present invention simulates the tempering behavior of the older apparatus, so that the user can reproduce the previously performed reaction protocols without any problems. In this way, migration from an older apparatus to a thermal cycler according to the present invention is facilitated.

FIG. 4 shows an example of the method 200 according to the present invention for determining at least one temperature change rate for controlling the tempering device of a thermal cycler by calculating at least one temperature change rate from the know runtime of a known tempering schedule. The method 200 comprises the following steps:

- Providing tempering schedule data that is determining the hold time and the temperature of at least one temperature step of the tempering schedule; (201)
- Providing run time data that is determining the run time required for the execution of the tempering schedule on a thermal cycler, (202)
- Determination of the at least one temperature change rate by means of an evaluation program using the tempering schedule data and the run time data; (203)
- Providing the at least one, previously determined, temperature change rate for controlling the tempering device of the thermal cycler in function of said at least one temperature change rate. (204)

FIG. 5 shows an example of the method 300 according to the present invention for controlling a tempering device of a thermal cycler, in which the thermal cycler comprises the tempering device for tempering a sample-receiving thermal block in order to perform polymerase chain reactions in these samples according to the tempering schedule defined by the method according to any one of claims 1 to 5, and comprises an electronic control device that is configured for controlling the tempering device by means of control parameters. Here, the method 300 comprises the following steps:

- Providing tempering schedule data that is determining the hold time and the temperature of at least one temperature step of the tempering schedule; (201)
- Providing run time data that is determining the run time required for the execution of the tempering schedule on a thermal cycler, (202)
- Determination of the at least one temperature change rate by means of an evaluation program using the tempering schedule data and the run time data; (203)
- Providing the at least one, previously determined, temperature change rate for controlling the tempering device of the thermal cycler in function of said at least one temperature change rate. (204)
- Using the at least one, previously determined, temperature change rate for the determination of control parameters, which comprise said at least one temperature change rate, and which determine a tempering control schedule corresponding to the tempering schedule; (301)
- Controlling the tempering device by means of the control parameter and the electronic control device in order to execute the tempering control schedule using said at least one temperature change rate. (302)

The invention claimed is:

1. A method of controlling a thermal cycler to perform polymerase chain reactions, the thermal cycler comprising:

- a sample-receiving thermal block including a temperature measurement device;
- a tempering device thermally coupled to the sample-receiving thermal block and configured to change a temperature of the sample-receiving thermal block; and
- an electronic control device comprising a data processing device, the electronic control device being operatively connected to the tempering device and to the temperature measurement device;

the method comprising:

- receiving, at the electronic control device, tempering schedule data defining a tempering schedule comprising a plurality of temperature steps, the tempering schedule data specifying, for each temperature step of said plurality, a respective temperature value and a respective hold time during which the sample-receiving thermal block is to be held at said temperature value;
- receiving, at the electronic control device, run time data specifying a total run time T for executing the tempering schedule on the thermal cycler;
- determining, by an evaluation program executed on the data processing device of the electronic control device, at least one temperature change rate from the tempering schedule data and the run time data according to the relationship $$T = \Sigma_s\text{\_heat} = 1^n(\text{T\_\{S\_heat\}} + \Delta\text{\_\{S\_heat\}}/\text{r\_H}) + \Sigma_s\text{\_cool} = 1^m(\text{T\_\{S\_cool\}} + \Delta\text{\_\{S\_cool\}}/\text{r\_C})$$

wherein, for each pair of adjacent temperature steps of the tempering schedule, T_{S_heat} is the hold time at a higher temperature level, T_{S_cool} is the hold time at a lower temperature level, Δ_{S_heat} is the temperature difference between said higher temperature level and said lower temperature level, Δ_{S_cool} is the temperature difference between said lower temperature level and said higher temperature level, r_H is a heating rate of the sample-receiving thermal block and r_C is a cooling rate of the sample-receiving thermal block, said heating rate r_H and said cooling rate r_C constituting said at least one temperature change rate;

determining, by the electronic control device, control parameters defining a tempering control schedule corresponding to the tempering schedule, said control parameters comprising said at least one temperature change rate; and controlling, by the electronic control device, the tempering device in accordance with said control parameters to execute the tempering control schedule using said at least one temperature change rate, while monitoring the temperature measurement device of the sample-receiving thermal block and adjusting said control parameters in real time so as to maintain said at least one temperature change rate during transitions between adjacent temperature steps of the tempering schedule, said at least one temperature change rate being defined as the difference quotient $(T_2(t_2)-T_1(t_1))/(t_2-t_1)$, wherein $t_1$ is the end of the hold time of a first temperature step at a first temperature $T_1(t_1)$ and $t_2$ is the beginning of the hold time of a second adjacent temperature step at a second temperature $T_2(t_2)$.

2. The method according to claim 1, wherein the plurality of temperature steps of the tempering schedule comprises at least a first temperature step having a first temperature and a first hold time and a second temperature step having a second temperature and a second hold time, the first temperature being higher than the second temperature, and wherein controlling the tempering device comprises:

causing, by the electronic control device, the tempering device to cool the sample-receiving thermal block from the first temperature to the second temperature using a cooling rate as said at least one temperature change rate; and causing, by the electronic control device, the tempering device to heat the sample-receiving thermal block from the second temperature to the first temperature using a heating rate as said at least one temperature change rate;

wherein both said cooling rate and said heating rate are determined by the evaluation program from the tempering schedule data and the run time data.

3. The method according to claim 1, wherein the thermal cycler further comprises a heatable lid arranged to cover the sample-receiving thermal block, and the method further comprises:

controlling, by the electronic control device, the heatable lid to reach a predetermined set temperature during a latency interval at the beginning of execution of the tempering schedule, said latency interval being a time interval between the start of execution of the tempering schedule and the moment at which the heatable lid reaches said set temperature;

wherein the run time data received at the electronic control device includes a duration of said latency interval, said duration being part of the run time T.

4. The method of claim 1, wherein $$r_C = \frac{\sum_{s_{heat}=1}^{n} \frac{\Delta_{s_{heat}}}{2} \sum_{s_{cool}=1}^{m} \Delta_{s_{cool}}}{T - \sum_{s_{heat}=1}^{n} T_{s_{heat}} - \sum_{s_{cool}=1}^{m} T_{s_{cool}}}$$

$$T > \sum_{s_{heat}=1}^{n} T_{s_{heat}} - \sum_{s_{cool}=1}^{m} T_{s_{cool}}$$

the heating rate r_H and the cooling rate r_C satisfy the relationship r_H=2·r_C, and wherein the cooling rate r_C is determined by the evaluation program according to:

$$\text{r\_C} = (\Sigma_s\text{\_heat} = 1^n\Delta\text{\_\{S\_heat\}}/2 + \Sigma_s\text{\_cool} = 1^m\Delta\text{\_\{S\_cool\}})/$$

$$(T - \Sigma_s\text{\_heat} = 1^n\text{T\_\{S\_heat\}} - \Sigma_s\text{\_cool} = 1^m\text{T\_\{S\_cool\}}).$$

5. The method according to claim 1, wherein the tempering device comprises at least one Peltier element thermally coupled to the sample-receiving thermal block.

6. The method according to claim 1, further comprising receiving, by the electronic control device via a user interface, a selection of a thermal cycler model TCx from a list of thermal cycler models;

retrieving, by the electronic control device, from a data storage device a table that correlates, with said selected thermal cycler model TCx, at least one of (i) a ratio r_H/r_C between the heating rate r_H and the cooling rate r_C of claim 1 and (ii) a duration of a transient oscillation associated with said selected thermal cycler model TCx; and using, by the electronic control device, the retrieved value or values in said determining of the control parameters of claim 1.

7. The method of claim 1, wherein the thermal cycler is a first thermal cycler having a maximum heating rate and a maximum cooling rate, and wherein said at least one temperature change rate determined by the evaluation program is smaller than said maximum heating rate and smaller than said maximum cooling rate, such that the controlling causes the first thermal cycler to simulate the tempering behavior of a second thermal cycler having lower maximum rates than the first thermal cycler.

* * * * *